(12) United States Patent
Lyu et al.

(10) Patent No.: US 11,028,708 B2
(45) Date of Patent: Jun. 8, 2021

(54) BLADE PROFILE TUBE NOZZLE FOR GAS TURBINE

(71) Applicant: AECC COMMERCIAL AIRCRAFT ENGINE CO., LTD., Shanghai (CN)

(72) Inventors: Jianbo Lyu, Shanghai (CN); Hualing Luo, Shanghai (CN); Shuzhen Hu, Shanghai (CN); Xiande Pan, Shanghai (CN); Guofeng Liu, Shanghai (CN)

(73) Assignee: AECC COMMERCIAL AIRCRAFT ENGINE CO., LTD., Shanghai (CN)

( * ) Notice: Subject to any disclaimer, the term of this patent is extended or adjusted under 35 U.S.C. 154(b) by 20 days.

(21) Appl. No.: 16/609,044

(22) PCT Filed: Jul. 28, 2017

(86) PCT No.: PCT/CN2017/094921
§ 371 (c)(1),
(2) Date: Oct. 28, 2019

(87) PCT Pub. No.: WO2018/196198
PCT Pub. Date: Nov. 1, 2018

(65) Prior Publication Data
US 2020/0149424 A1    May 14, 2020

(30) Foreign Application Priority Data

Apr. 26, 2017 (CN) .......................... 201710281244.5

(51) Int. Cl.
*F01D 9/04* (2006.01)
*F01D 25/12* (2006.01)
(Continued)

(52) U.S. Cl.
CPC .............. *F01D 9/041* (2013.01); *F01D 25/12* (2013.01); *F01D 9/023* (2013.01); *F02C 7/18* (2013.01);
(Continued)

(58) Field of Classification Search
CPC ... F01D 5/082; F01D 9/02; F01D 9/04; F01D 9/041; F01D 25/12; F02C 7/12;
(Continued)

(56) References Cited

U.S. PATENT DOCUMENTS 5,245,821 A    9/1993   Thomas, Jr. et al.
5,402,636 A *  4/1995   Mize .......................... F01D 3/00
                                                                60/806
(Continued)

FOREIGN PATENT DOCUMENTS

CN    105114186 A    12/2015
CN    105464724 A    4/2016
(Continued)

OTHER PUBLICATIONS

International Search Report dated Dec. 14, 2017 in corresponding International Application No. PCT/CN2017/094921; 4 pages.
(Continued)

*Primary Examiner* — Igor Kershteyn
(74) *Attorney, Agent, or Firm* — Maier & Maier, PLLC

(57) ABSTRACT

An impeller tube-type nozzle for a gas turbine, with an inlet section, a retraction section and an outlet section. The inlet section is a section of annular channel, the retraction section comprises multiple gas flow channels separated by multiple blades, each gas flow channel is encircled by an outer peripheral wall face, an inner peripheral wall face, a suction face of one of two adjacent blades and a pressure face of the other of the two adjacent blades, and inlets of the gas flow channels have a fan-shaped cross section. For each gas flow channel, along the direction of gas flow from the inlet of the gas flow channel to the outlet the fan-shaped cross section gradually smoothly transitions into a circular cross section.

7 Claims, 4 Drawing Sheets

(51) Int. Cl.
*F01D 9/02* (2006.01)
*F02C 7/18* (2006.01)

(52) U.S. Cl.
CPC .... *F05D 2220/323* (2013.01); *F05D 2230/21* (2013.01); *F05D 2240/128* (2013.01); *F05D 2240/80* (2013.01); *F05D 2260/14* (2013.01)

(58) Field of Classification Search
CPC .. F02C 7/18; F05D 2220/323; F05D 2230/21; F05D 2240/128; F05D 2240/80; F05D 2250/141; F05D 2260/14
See application file for complete search history.

(56) References Cited

U.S. PATENT DOCUMENTS

| | | | | |
|---|---|---|---|---|
| 6,234,746 | B1 * | 5/2001 | Schroder | F01D 5/08 415/110 |
| 6,595,741 | B2 * | 7/2003 | Briesenick | F01D 11/025 415/116 |
| 8,584,469 | B2 | 11/2013 | Laurello et al. | |
| 8,926,267 | B2 * | 1/2015 | Lee | F01D 5/082 415/115 |
| 9,228,436 | B2 | 1/2016 | Meyer et al. | |
| 2011/0162387 | A1 | 7/2011 | Chir et al. | |
| 2011/0247345 | A1 * | 10/2011 | Laurello | F02C 7/12 60/806 |
| 2011/0247346 | A1 * | 10/2011 | Kimmel | F01D 5/081 60/806 |
| 2014/0010634 | A1 | 1/2014 | Meyer et al. | |
| 2015/0010385 | A1 * | 1/2015 | Oyarbide | F01D 25/12 415/115 |
| 2016/0084095 | A1 | 3/2016 | Stafford | |
| 2017/0030210 | A1 | 2/2017 | Oyarbide | |

FOREIGN PATENT DOCUMENTS

| | | |
|---|---|---|
| CN | 205669438 U | 11/2016 |
| EP | 1 079 067 A2 | 2/2001 |
| RU | 2484264 C2 | 6/2013 |

OTHER PUBLICATIONS

Adrien Dulac, "A CFD Analysis Towards Flow Characteristics of Three Pre-Swirl Designs", Master of Science Thesis, Royal Institute of Technology, Sweden, 2012, 87 pages.
Gao-wen Liu et al., "Investigation on Flow Characteristics and Temperature Drop of an Aerodynamic-Hole Typed Pre-Swirl Nozzle", Journal of Propulsion Technology, vol. 34, No. 3, Mar. 2013, 7 pages, including English Abstract.
Yu-xin Liu et al., "Numerical Investigation on Flow Characteristics of a Vane Shaped Hole Preswirl Nozzle", Journal of Propulsion Technology, vol. 37, No. 2, Feb. 2016, 7 pages, including English Abstract.
Gao-wen Liu et al., "Numerical Simulations on the Flow Characteristics of the Pre-Swirl Nozzles with Different Length-to-Diameter Ratios", Journal of Propulsion Technology, vol. 34, No. 5, May 2013, 7 pages, including English Abstract.
Chinese Search Report dated Apr. 8, 2019 in corresponding Chinese Application No. 201710281244.5; 4 pages.
Russian Search Report dated May 28, 2020 in corresponding Russian Application No. 2019136870; 4 pages.
Russian Decision to Grant issued May 28, 2020 in corresponding Russian Application No. 2019136870; 11 pages.
The Extended European Search Report dated Dec. 9, 2020, including the Supplementary European Search Report and the European Search Opinion, in connection with corresponding EP Application No. 17907287.1 (7 pp.).

* cited by examiner

BLADE PROFILE TUBE NOZZLE FOR GAS TURBINE

FIELD

The present disclosure relates to a pre-swirl nozzle of a pre-swirl cooling system of an aviation gas turbine engine.

BACKGROUND

In the design of high-pressure turbine components of an aero-engine, cool air of a high-pressure turbine rotor is usually supplied by air being inhaled by a compressor and then passing through a combustion chamber. When the cool air is transported to the front of a rotating disk of a high-pressure turbine, the relative total temperature of the cool air will increase due to rotation of the disk, which is not conducive to cooling the high-pressure turbine. In engineering design, a pre-swirl nozzle is usually used for turning airflow to reduce the relative total temperature of the cool air and reduce consumption of the cool air so as to improve the cooling effect of the high-pressure turbine and reduce the fuel consumption rate of the engine.

According to domestic and foreign engine models in service and public materials, two types i.e. a circular tube type and a blade type are mainly used for the pre-swirl nozzle design.

A straight circular tube pre-swirl nozzle is first applied with the advantages such as fewer passages, better outlet airflow angle properties and easier production and manufacturing. However, with the gradual increase of cycle parameters of the aero-engine, the lower cooling performance, no matter in a straight circular tube type or a flared tube type by expanding an inlet tube diameter (prior art 1), is becoming more and more difficult to accept.

Blade profile is the most ideal structure for turning an airflow direction known to human beings, and researchers find that a blade type pre-swirl nozzle can achieve better cooling performance than the circular tube type. However, in order to achieve the turning of the airflow, it is needed that the number of passages (equal to the number of blades) of the blade type pre-swirl nozzle is multiplied than that of the circular tube pre-swirl nozzle. Meanwhile, the blade height of the blade type pre-swirl nozzle is usually very low (3-4 mm), which, on the one hand, results in a small span-chord ratio and limits the cooling performance of the blade type pre-swirl nozzle, and more importantly, greatly increases the difficulty in production and manufacturing. In industrial production, the blade type pre-swirl nozzle is usually obtained by welding or casting. The large number of blades and the low blade height make welding production complex and expensive and the yield rate of casting production low, and therefore, the blade type pre-swirl nozzle is more difficult in engineering application.

Some researchers have put forward a scheme of a blade profile hole pre-swirl nozzle (prior art 2), in which the blade is thickened by separating a suction face and a pressure face of the blade profile by a certain distance so as to reduce a throat width of a single circulation passage. The blade height can be raised by keeping the total throat area unchanged during design. This technical solution can solve the problem of a low blade height of the blade type pre-swirl nozzle in a certain range, but a leading edge of the blade will be too thick and the geometry will be flat and blunt by increasing the distance between the suction face and the pressure face to thicken the blade profile. Greater aerodynamic loss is generated when the airflow flows around the leading edge with high thickness and flatness, and especially when working at a working condition of Reynolds number $Re < 4 \times [10]^5$, the performance of the blade profile hole pre-swirl nozzle will be degraded to the level of a flared tube pre-swirl nozzle and is not as stable as the performance of the blade type pre-swirl nozzle. Meanwhile, according to this kind of blade profile hole pre-swirl nozzle (prior art 2), the number of the blades cannot be significantly decreased without reducing the performance level. If this kind of blade profile hole pre-swirl nozzle (prior art 2) is applied to production, it will still encounter the same technical difficulty as in the blade type pre-swirl nozzle.

SUMMARY

An object of the present disclosure is to provide a blade profile tube nozzle for a gas turbine, and compared with a blade profile hole nozzle, the number of blades can be significantly decreased without degrading performance.

The blade profile tube nozzle for a gas turbine of the present disclosure comprises an inlet section, a tapered section and an outlet section which are sequentially connected in a flow direction of airflow, wherein the inlet section is an annular passage, the tapered section comprises a plurality of airflow circulation passages separated by a plurality of blades, each of the airflow circulation passages is enclosed by an outer circumferential wall face, an inner circumferential wall face, a suction face of one of two adjacent blades and a pressure face of the other one of the two adjacent blades, and the cross-section of an inlet of the airflow circulation passage is fan-shaped; from the flow direction of the airflow, with regard to each of the airflow circulation passages, the fan-shaped cross-section gradually and smoothly transitions to a circular cross-section from the inlet to an outlet of the airflow circulation passage, wherein the two adjacent blades are provided as a turning point of a dominant airflow in a circumferential direction of the nozzle, and the outer circumferential wall face and the inner circumferential wall face are provided as a turning point of the dominant airflow in a radial direction of the nozzle; and the outlet section comprises circular tubes respectively connected to the outlets of the airflow circulation passages correspondingly and with the diameter not changing along the axis.

In an embodiment, the outlet section is a spiral tube with a spiral line as an axis, the spiral line penetrates through the center of the circular cross-section, and a tangent line of the spiral line at the center of the circular cross-section is parallel to a normal vector of the circular cross-section.

In an embodiment, an axial distance between the center of the circular cross-section and an outlet of the circular tube along the axis of the circular tube is an axial length of the circular tube, being between 0.1 and 5 times the diameter of the circular cross-section.

In an embodiment, the outlet section is a straight tube with a straight line as an axis, and the axis penetrates through the center of the circular cross-section and is parallel to a normal vector of the circular cross-section.

In an embodiment, the inlet section is an annular passage.

In an embodiment, the circular tube takes a projection line of one straight line as the axis, the projection line is the projection of the straight line on a revolving face on which the center of an initial circular cross-section of the circular tube is located, and the revolving face is a cylindrical face which takes as the diameter a vertical line from the center of the initial circular cross-section to an axis of the blade profile tube nozzle and is stretched in the axial direction parallel to the blade profile tube nozzle.

In an embodiment, the blade profile tube nozzle is used in a pre-swirl cooling system in a high pressure turbine of an aero-engine, and cool air is turned and then sent to a blade root of a high-pressure turbine rotor.

As previously described, in the engineering design of the blade type pre-swirl nozzle, it is necessary to increase the blade pitch, reduce the number of the blades and increase the blade height to reduce the difficulty in production and manufacturing. According to the blade type pre-swirl nozzle, the blade height cannot be increased without degrading performance, but the circular tube type has the advantages of a proper size and easy production; and meanwhile, the blade profile design of the blade type is very difficult and the blade performance is severely reduced when the number of the blades is significantly decreased. The circular tube type has the advantages of fewer passages, but has low performance. The main reason why the aerodynamic performance of the circular tube pre-swirl nozzle is poor is that the airflow turning thereof at the inlet section is too large and there will be large separation flow, and even the flared tube pre-swirl nozzle still has a limited improvement in the aerodynamic performance thereof, being far less excellent than the blade type in performance.

The blade profile tube nozzle of the present disclosure has the advantages of fewer passages, easy production and manufacturing and the like, and has a pre-swirl nozzle with a similar performance level as the blade type pre-swirl nozzle meanwhile, and the number of the blades can be significantly decreased without degrading performance in comparison to the blade profile hole nozzle. The blade profile is used for controlling the cross-section of the fan-shaped flow passage such that same smoothly tapers to the shape of a circular tube, and a section of circular tube is kept until to the outlet. The diameter of the circular tube does not change along the axis, thus realizing a new type of blade profile tube pre-swirl nozzle designed by the combination of the blade and the circular tube. The blade turns the airflow with low aerodynamic loss, and the circular tube can stabilize an outlet direction of the airflow, thereby achieving smooth transition between the blade and the circular tube; and the blade profile hole pre-swirl nozzle is transitioned from one fan-shaped face to another fan-shaped face, and the flow passage is tapering all the time. The circular tube of the blade profile tube pre-swirl nozzle is designed based on the circular tube pre-swirl nozzle, significantly decreasing the number of the blades and increasing the size of the blade outlet height. According to the blade profile tube pre-swirl nozzle of the present disclosure, the flow passage achieving an airflow turning function is designed based on the blade type pre-swirl nozzle, and the cross-section of the flow passage smoothly tapers to a circular tube shape along the blade profile, overcoming the defects of the excessive thickness near the leading edge, the flat and blunt leading edge and the like of the blade profile hole pre-swirl nozzle, and avoiding performance degrading in a working condition of a slightly low Reynolds number, so that the blade profile tube pre-swirl nozzle has the performance level similar to that of the blade type and working range with stable performance.

BRIEF DESCRIPTION OF THE DRAWINGS

The above-mentioned and other features, properties and advantages of the present disclosure will become more apparent from the following description of embodiments with reference to the accompanying drawings, in which.

DETAILED DESCRIPTION

The present disclosure will be further described below in conjunction with particular embodiments and the accompanying drawings, and more details are explained in the following description for the ease of fully understanding the present disclosure; however, the present disclosure can obviously be implemented in various different manners than that described herein, a person skilled in the art can make a similar extension and deduction without departing from the connotation of the present disclosure according to the practical applications, and therefore, the scope of protection of the present disclosure should not be limited to the content of the particular embodiments herein.

It should be noted that the drawings are merely used as examples, and are not necessarily drawn to scale, and should not be taken as a limitation to the actually claimed scope of protection of the present disclosure.

Figure 7:
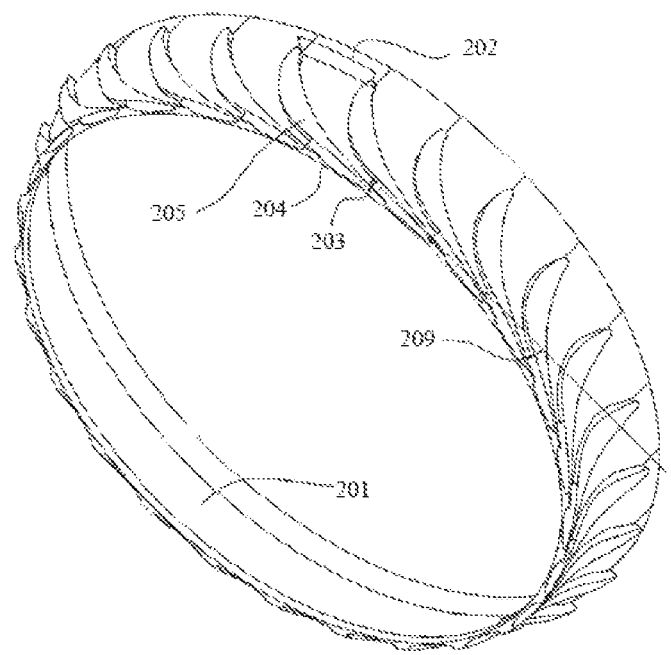
FIG. 7 is a perspective view of the split body of the revolving face of 50% of the blade height of the blade profile tube nozzle of a further embodiment of the present disclosure.
Figure 8:
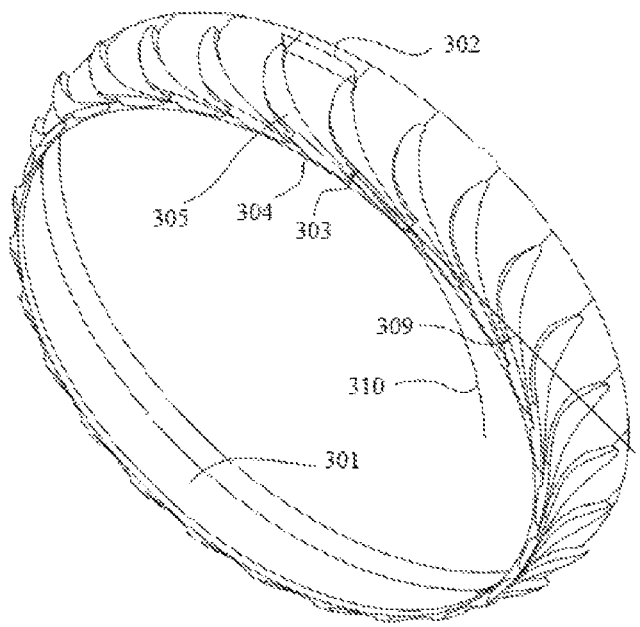
FIG. 8 is a perspective view of the split body of the revolving face of 50% of the blade height of the blade profile tube nozzle of a still further embodiment of the present disclosure.

FIGS. 1-6 show an embodiment of the present disclosure. FIG. 7 shows a further embodiment of the present disclosure. FIG. 8 shows a still further embodiment of the present disclosure.

As shown in FIGS. 1-6, in an embodiment of the present disclosure, a blade profile tube nozzle 101 comprises an outer circumferential lateral wall 110, an inner circumferential lateral wall 111, a plurality of blades 105 and a plurality of circular tubes 104. The outer circumferential lateral wall 110 and the inner circumferential lateral wall 111 are annular members, the inner circumferential lateral wall is located in the outer circumferential lateral wall 110, the plurality of blades 105 are connected and fixed between the outer circumferential lateral wall 110 and the inner circumferential lateral wall 111, and the plurality of circular tubes 104 are also connected and fixed between the outer circumferential lateral wall 110 and the inner circumferential lateral wall 111. The blade profile of the blade 105 can be provided based on the blade of the existing blade type pre-swirl nozzle, and comprises a leading edge, a trailing edge, a pressure face, a suction face, a base end and a top end. The base end is connected and fixed to an outer circumferential face of the inner circumferential lateral wall 111, the top end is connected and fixed to an inner circumferential face of the outer circumferential lateral wall 110, the leading edge is located at an inlet of an after-mentioned airflow circulation passage, and the trailing edge is located at an outlet of the airflow circulation passage.

Figure 1:
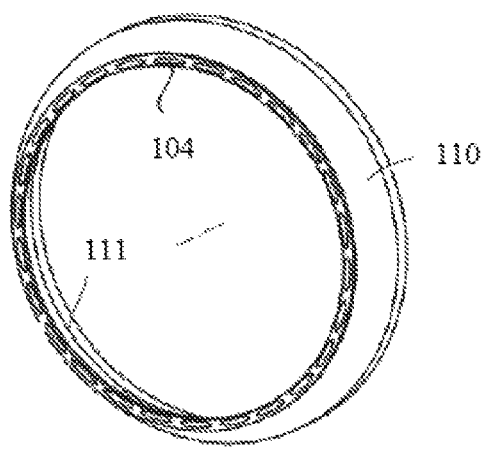
FIG. 1 is a perspective view of a blade profile tube nozzle of the present disclosure, wherein an outlet side thereof is shown in a transverse cross-section.
Figure 2:
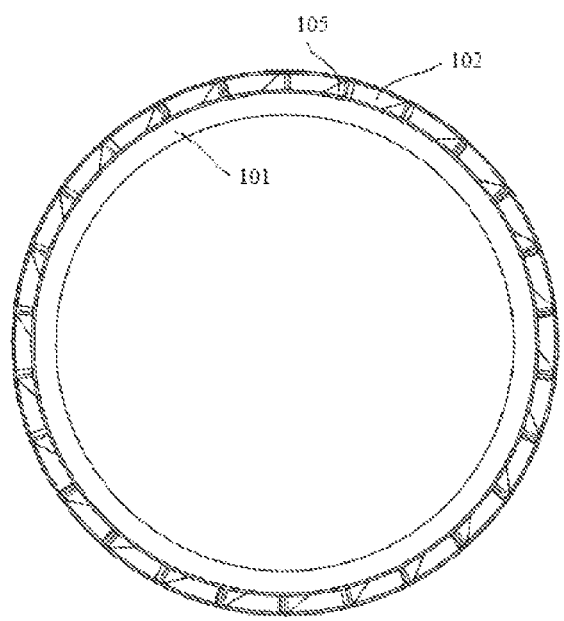
FIG. 2 is a front view of the blade profile tube nozzle of the present disclosure, wherein an inlet side thereof is shown in the transverse cross-section.
Figure 3:
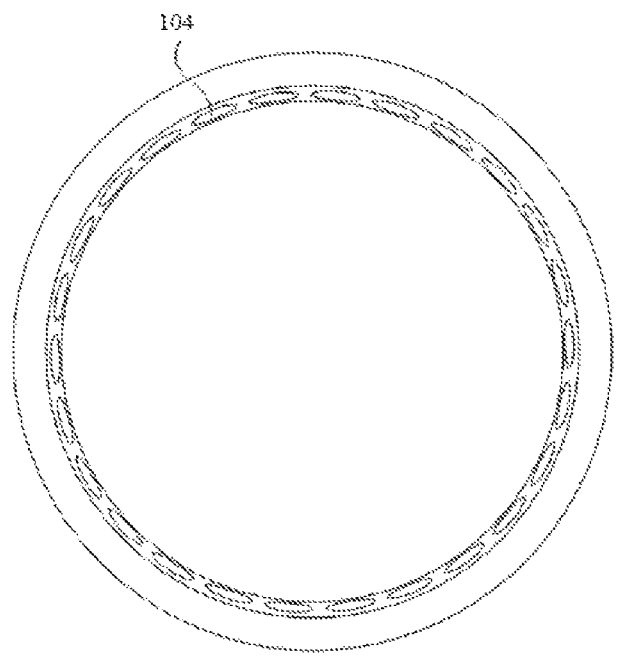
FIG. 3 is a rear view of the blade profile tube nozzle of the present disclosure, wherein the outlet side thereof is shown in the transverse cross-section.

The blade profile tube nozzle 101 comprises an inlet section 108, a tapered section 107 and an outlet section 106. A preferred entity type of the blade profile tube nozzle 101 can be a casting monomer, and the inlet section 108, the tapered section 107 and the outlet section 106 can be the description of different geometrical positions of the casting monomer. Smooth transition between the inlet section 108 and the outlet section 106 is achieved relying on the tapered section 107, thereby forming a complete and continuous circulation passage. The inlet section 108 is an annular passage defined between the outer circumferential lateral wall 110 and the inner circumferential lateral wall 111, and can be used for mounting the blade profile tube nozzle 101 on an outer wall of a plenum in a combustion chamber. The tapered section 107 is enclosed together by the outer circumferential lateral wall 110, the inner circumferential lateral wall 111 and the plurality of blades 105, wherein an airflow circulation passage is enclosed together by two adjacent blades 105, an inner wall face of the outer circumferential lateral wall 110, and an outer wall face of the inner circumferential lateral wall 111, and a plurality of airflow circulation passages are distributed in the whole circumferential direction of the blade profile tube nozzle 101. In the following, one airflow circulation passage is illustrated as an example, and the description thereof is also suitable for other airflow circulation passages. As shown in FIG. 2, the inlet 102 of the airflow circulation passage is fan-shaped, here "fan shape" can be understood as a shape formed by the intersection of an arc defined by the outer circumferential lateral wall 110 and the inner circumferential lateral wall 111 with a straight line defined by the suction face 112 of one blade 105 and a straight line defined by the pressure face 113 of the adjacent blade.

Figure 4:
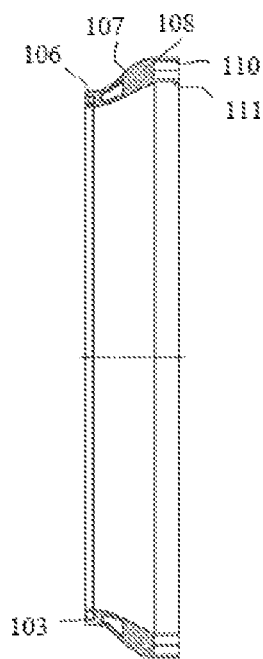
FIG. 4 is a lateral half cross-sectional view of the blade profile tube nozzle of the present disclosure.

As shown in FIG. 4, the outlet of the airflow circulation passage is a circular cross-section 103.

As shown in FIGS. 1-6, for one airflow circulation passage, from the flow direction of the airflow, the shape from the inlet 102 to the outlet 103 tapers. On the one hand, the distance between the outer circumferential lateral wall 110 and the inner circumferential lateral wall 111 gradually decreases, on the other hand, the distance between the suction face 112 and the pressure face 113 which are opposite each other also gradually decreases, and the shape of the cross-section of the airflow passage tapers to a circular shape from the fan shape. The blade 105 is configured as a turning point of the airflow of a dominant airflow circulation passage in the circumferential direction of the blade profile tube nozzle 101, and the outer circumferential lateral wall 110 and the inner circumferential lateral wall 111 are configured as a turning point of the dominant airflow in a radius direction of the blade profile tube nozzle 101.

Figure 5:
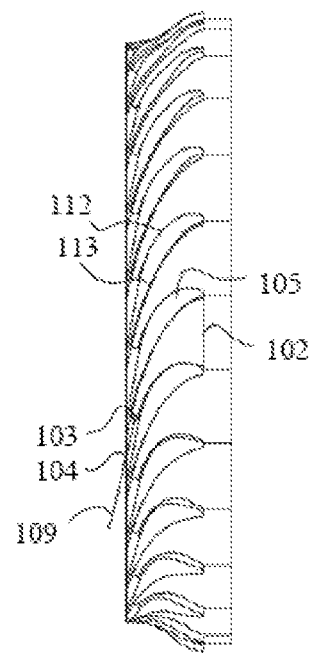
FIG. 5 is a side view of a split body of a revolving face of 50% of the blade height of the blade profile tube nozzle of the present disclosure.
Figure 6:
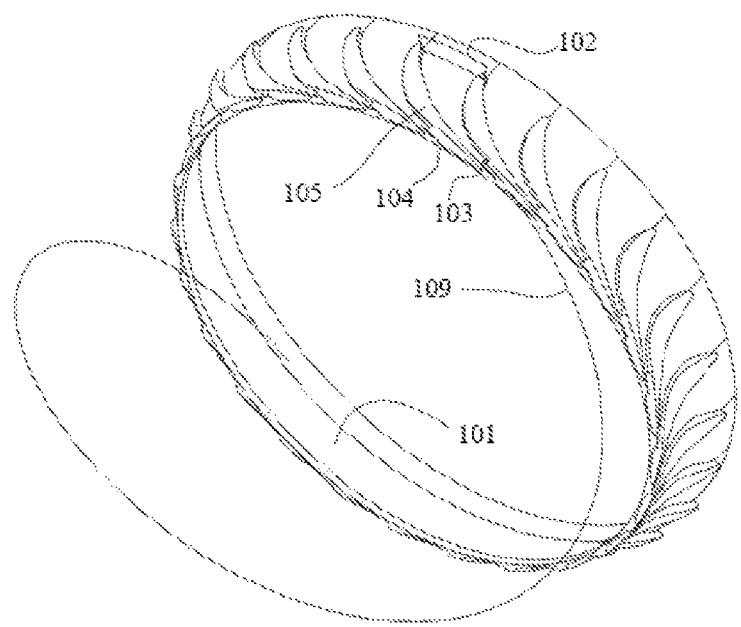
FIG. 6 is a perspective view of the split body of the revolving face of 50% of the blade height of the blade profile tube nozzle of the present disclosure.

As shown in FIG. 5 and FIG. 6, corresponding to each airflow circulation passage, the outlet section 106 provides a circular tube 104 with the diameter not changing along the axis, wherein the circular tube 104 takes a spiral line 109 as the axis, and the spiral line 109 penetrates through the center of the circular cross-section 103. A tangent line of the spiral line 109 at the center of the circular cross-section 103 is parallel to a normal vector of the circular cross-section 103.

An axial distance between the center of the circular cross-section 103 and the outlet of the circular tube 104 is an axial length of the circular tube 104 and can be between 0.1 and 5 times the diameter of the circular cross-section 103.

The number of the blades of the tapered section 107 can be 8-40, and in the embodiment shown in the FIG. 26 blades 105 are provided.

According to the preceding embodiment, the blade profiles of two adjacent blades 105 are used for controlling the cross-section of the fan-shaped flow passage such that same smoothly tapers to the shape of a circular tube, and a section of circular tube 104 is kept until to the outlet of the nozzle. The diameter of the circular tube 104 does not change along the axis, thus realizing a new type of blade profile tube pre-swirl nozzle designed by the combination of the blade 105 and the circular tube 104. The blade 105 turns the airflow with low aerodynamic loss, and the circular tube 104 can stabilize an outlet direction of the airflow, thereby achieving smooth transition between the blade 105 and the circular tube 104.

The circular tube 104 of the blade profile tube pre-swirl nozzle as shown in the figures is designed based on the circular tube pre-swirl nozzle, significantly decreasing the number of the blades and increasing the size of the blade height. Distinct advantages are achieved compared with the blade profile hole pre-swirl nozzle in that the blade profile hole pre-swirl nozzle can achieve the effect of increasing the blade height only by decreasing the throat width of a single passage and cannot significantly decrease the number of the blades without degrading performance. According to the blade profile tube pre-swirl nozzle of the preceding embodiment, the smaller number of the blades and larger blade height size overcome the defects of the blade type pre-swirl nozzle and modifications thereof, and therefore, the production and manufacturing difficulty can be reduced and the yield rate can be improved.

Further referring to FIGS. 1-6, the airflow circulation passage before the circular tube 104 of the blade profile tube pre-swirl nozzle of the present disclosure is designed based on the blade type pre-swirl nozzle, the cross-section of the flow passage smoothly tapers to the shape of a circular tube along the blade profile, and therefore the problems of the excessive thickness near the leading edge, the flat and blunt leading edge and the like of the blade profile hole pre-swirl nozzle will not occur. The flat and blunt leading edge and large thickness of the blade profile hole pre-swirl nozzle cause severe performance degrading of the nozzle in a working condition with a slightly low Reynolds number, while the blade profile tube pre-swirl nozzle has the performance level similar to that of the blade type and working range with stable performance.

FIG. 7 shows a further embodiment of the present disclosure, and the description of the same technical content is selectively omitted in this embodiment. With regard to the description of the omitted part, reference can be made to the preceding embodiment, and no redundant description will be provided in this embodiment.

The differences between the embodiment shown in FIG. 7 and the preceding embodiment are: an outlet section 206 is a circular tube 204 with the diameter not changing along the axis, the circular tube 204 takes a straight line 209 as the axis, and the straight line 209 penetrates through the center of a circular cross-section 203 and is parallel to a normal vector of the circular cross-section 203.

FIG. 8 shows a still further embodiment of the present disclosure, and the description of the same technical content is selectively omitted in this embodiment. With regard to the description of the omitted part, reference can be made to the preceding embodiment, and no redundant description will be provided in this embodiment. As shown in FIG. 8, the differences between this embodiment and that shown in FIGS. 1-6 are: an outlet section 306 is a circular tube 304 with the diameter not changing along the axis, and the circular tube 304 takes a projection line 310 of the straight line 309 as the axis. The projection line 310 is the projection of the straight line 309 on a revolving face on which the center of the circular cross-section 303 is located, and the revolving face is a cylindrical face with a radius defined by a vertical line from the center of the circular cross-section 303 to an axis of the blade profile tube nozzle 301 and is stretched parallel to the axial direction of blade profile tube nozzle 301.

According to tests of inventors, the flow coefficient range of the same type of pre-swirl nozzles near the pressure ratio of 1.6 is listed as follows:

| Nozzle type | Flow coefficient range |
|---|---|
| Blade type | 0.91-0.95[1] |
| Straight circular tube type | Below 0.89[4] |
| Flared tube type (prior art 1) | 0.88-0.91[1][2] |
| Blade profile hole type (prior art 2) | 0.94[3] |
| Blade profile tube type of the present disclosure | 0.92-0.95 |

REFERENCES

[1] A CFD ANALYSIS TOWARDS FLOW CHARACTERISTICS OF THREE PRE-SWIRL DESIGNS, Adrien Dulac, Master of Science Thesis, Royal Institute of Technology, Sweden

[2] Investigation on Flow Characteristics and Temperature Drop of an Aerodynamic-Hole Typed Pre-Swirl Nozzle, LIU Gaowen et al., Propulsion Technology, Vol. 34, No. 3, April 2013

[3] Numerical Investigation on Flow Characteristics of a Vane Shaped Hole Preswirl Nozzle, LIU Yuxin et al., Propulsion Technology, Vol. 37, No. 2, February 2016

[4] Numerical Investigation on the Flow of Preswirl Nozzle in Gas Turbine, LIU Gaowen et al., Propulsion Technology, Vol. 34, No. 5, May 2013

The present disclosure has been disclosed above in terms of the preferred embodiments which, however, are not intended to limit the present disclosure, and any person skilled in the art could make possible changes and alterations without departing from the spirit and scope of the present disclosure. Hence, any alterations, equivalent changes and modifications which are made to the above-mentioned embodiments in accordance with the technical substance of the present disclosure and without departing from the content of the technical solutions of the present disclosure, will fall within the scope of protection defined by the claims of the present disclosure.

The invention claimed is:

1. A blade profile tube nozzle for a gas turbine, comprising:
   an inlet section which is an annular passage;
   a tapered section which comprises a plurality of airflow circulation passages separated by a plurality of blades; and
   an outlet section, comprising circular tubes respectively connected to the outlets of the airflow circulation passages correspondingly and with the diameter not changing along the axis;
   wherein the inlet section, the tapered section and the outlet section are sequentially connected in a flow direction of airflow,
   and each of the airflow circulation passages is enclosed by an outer circumferential wall face, an inner circumferential wall face, a suction face of one of two adjacent blades and a pressure face of the other one of the two adjacent blades, and cross-section of an inlet of the airflow circulation passage is fan-shaped,
   and from the flow direction of the airflow, with regard to each of the airflow circulation passages, the fan-shaped cross-section gradually and smoothly transitions to a circular cross-section from the inlet to an outlet of the airflow circulation passage, wherein the two adjacent blades are provided as a turning point of a dominant airflow in a circumferential direction of the nozzle, and the outer circumferential wall face and the inner circumferential wall face are provided as a turning point of the dominant airflow in a radial direction of the nozzle.

2. A blade profile tube nozzle for a gas turbine, comprising:
   an inlet section which is an annular passage;
   a tapered section which comprises a plurality of airflow circulation passages separated by a plurality of blades; and
   an outlet section, comprising circular tubes respectively connected to the outlets of the airflow circulation passages correspondingly and with the diameter not changing along the axis;
   wherein the inlet section, the tapered section and the outlet section are sequentially connected in a flow direction of airflow,
   and each of the airflow circulation passages is enclosed by an outer circumferential wall face, an inner circumferential wall face, a suction face of one of two adjacent blades and a pressure face of the other one of the two adjacent blades, and cross-section of an inlet of the airflow circulation passage is fan-shaped,
   and from the flow direction of the airflow, with regard to each of the airflow circulation passages, the fan-shaped cross-section gradually and smoothly transitions to a circular cross-section from the inlet to an outlet of the airflow circulation passage, wherein the two adjacent blades are provided as a turning point of a dominant airflow in a circumferential direction of the nozzle, and the outer circumferential wall face and the inner circumferential wall face are provided as a turning point of the dominant airflow in a radial direction of the nozzle,
   wherein the outlet section is a spiral tube with a spiral line as an axis, the spiral line penetrates through the center of the circular cross-section, and a tangent line of the spiral line at the center of the circular cross-section is parallel to a normal vector of the circular cross-section.

3. The blade profile tube nozzle of claim 2, wherein an axial distance between the center of the circular cross-section and an outlet of the circular tube along the axis of the circular tube is an axial length of the circular tube, being between 0.1 and 5 times the diameter of the circular cross-section.

4. The blade profile tube nozzle of claim 1, wherein the outlet section is a straight tube with a straight line as an axis, and the axis penetrates through the center of the circular cross-section and is parallel to a normal vector of the circular cross-section.

5. The blade profile tube nozzle of claim 1, wherein the inlet section is an annular passage.

6. The blade profile tube nozzle of claim 2, wherein the circular tube takes a projection line of one straight line as the axis, the projection line is the projection of the straight line on a revolving face on which the center of an initial circular cross-section of the circular tube is located, and the revolving face is a cylindrical face with a radius defined by a vertical line from the center of the initial circular cross-section to an axis of the blade profile tube nozzle and is stretched parallel to the axial direction of blade profile tube nozzle.

7. The blade profile tube nozzle of claim 2, wherein the blade profile tube nozzle is used in a pre-swirl cooling system in a high pressure turbine of an aviation engine, and cool air is turned and then sent to a blade root of a high-pressure turbine rotor.

\* \* \* \* \*